United States Patent
Walsh et al.

(10) Patent No.: US 12,467,617 B2
(45) Date of Patent: Nov. 11, 2025

(54) EXTERNALLY CONTROLLED INDICATOR

(71) Applicant: MILWAUKEE ELECTRIC TOOL CORPORATION, Brookfield, WI (US)

(72) Inventors: Jay Walsh, Brookfield, WI (US); Steven M. Smith, Greenfield, WI (US); Jonathan E. Abbott, Milwaukee, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 221 days.

(21) Appl. No.: 18/169,638

(22) Filed: Feb. 15, 2023

(65) Prior Publication Data
US 2023/0296234 A1  Sep. 21, 2023

Related U.S. Application Data
(60) Provisional application No. 63/310,799, filed on Feb. 16, 2022.

(51) Int. Cl.
| | |
|---|---|
| *H01H 13/02* | (2006.01) |
| *F21S 9/02* | (2006.01) |
| *F21V 23/04* | (2006.01) |
| *G08C 17/02* | (2006.01) |
| *G08C 23/04* | (2006.01) |

(52) U.S. Cl.
CPC ............ *F21V 23/0435* (2013.01); *F21S 9/02* (2013.01); *G08C 17/02* (2013.01); *G08C 23/04* (2013.01); *H01H 13/023* (2013.01)

(58) Field of Classification Search
CPC ........ F21V 23/0435; F21S 9/02; G08C 17/02; G08C 23/04; H01H 13/023
USPC ......................................................... 315/307
See application file for complete search history.

(56) References Cited

U.S. PATENT DOCUMENTS

| | | | | |
|---|---|---|---|---|
| 7,298,240 | B2 * | 11/2007 | Lamar | G07C 9/00309 |
| | | | | 340/5.1 |
| 7,397,342 | B2 | 7/2008 | Mullet et al. | |
| 7,453,219 | B2 | 11/2008 | Mor et al. | |
| 8,253,338 | B2 | 8/2012 | Ashoff et al. | |
| 8,862,104 | B2 | 10/2014 | Mian et al. | |
| 9,055,033 | B2 * | 6/2015 | Mergener | G06F 12/023 |
| 9,167,076 | B2 | 10/2015 | Cai et al. | |
| 9,531,863 | B2 | 12/2016 | Mian et al. | |
| 9,547,218 | B2 | 1/2017 | Takahashi et al. | |
| 9,900,967 | B2 * | 2/2018 | Isaacs | H05B 47/19 |
| 10,078,322 | B2 * | 9/2018 | Khalaf | G05B 19/41805 |

(Continued)

*Primary Examiner* — Ryan Jager
(74) *Attorney, Agent, or Firm* — Michael Best & Friedrich LLP

(57) ABSTRACT

A device for performing a function. The device including a housing, an indicator configured to provide an indication, a first electronic processer within the housing and configured to control operation of the indicator, and a wireless communication device including a second electronic processer. The wireless communication device is configured to wirelessly communicate with an external device, communicate with the first electronic processer to transfer data between the first electronic processer and the external device, receive a signal from the external device, and provide the signal to the first electronic processer. The first electronic processer is configured to prohibit, in response to receiving the signal from the wireless communication device, the indicator from providing the indication.

20 Claims, 12 Drawing Sheets

(56) References Cited

U.S. PATENT DOCUMENTS

| | | | |
|---|---|---|---|
| 10,131,043 B2* | 11/2018 | Mergener | B25B 23/1475 |
| 10,149,142 B2* | 12/2018 | Coulis | H04W 8/005 |
| 10,295,990 B2* | 5/2019 | Dey, IV | H04L 67/125 |
| 10,339,496 B2* | 7/2019 | Matson | G06Q 10/087 |
| 10,345,797 B2* | 7/2019 | Conrad | B25F 5/00 |
| 10,380,883 B2* | 8/2019 | Matson | H04L 67/306 |
| 10,510,199 B2* | 12/2019 | Hoossainy | G07C 9/30 |
| 10,569,398 B2* | 2/2020 | Mergener | H02J 7/0024 |
| 10,701,561 B1* | 6/2020 | Sheffield | H04W 12/047 |
| 11,212,909 B2* | 12/2021 | Smith | B25F 5/02 |
| 11,260,514 B2* | 3/2022 | Hoossainy | H04W 4/029 |
| 11,375,610 B2* | 6/2022 | Lienau | H01R 12/7058 |
| 11,395,142 B2* | 7/2022 | Sheffield | H04W 12/71 |
| 11,570,888 B2* | 1/2023 | Lienau | B25F 5/02 |
| 11,592,801 B2* | 2/2023 | Krondorfer | B25F 5/00 |
| 11,665,519 B2* | 5/2023 | Brault | H01M 50/247 |
| | | | 700/286 |
| 11,871,509 B2* | 1/2024 | Lienau | H01R 12/727 |
| 11,902,778 B2* | 2/2024 | Davis | H04L 63/062 |
| 11,903,592 B2* | 2/2024 | Narducci | A61B 17/14 |
| 11,963,079 B2* | 4/2024 | Brault | H01M 50/247 |
| 12,124,306 B2* | 10/2024 | Thannhuber | G06Q 10/06316 |
| 12,133,324 B2* | 10/2024 | Lienau | H01R 12/7058 |
| 2006/0071753 A1* | 4/2006 | Lamar | G07C 9/00309 |
| | | | 340/13.24 |
| 2014/0151079 A1* | 6/2014 | Furui | G05B 13/024 |
| | | | 173/171 |
| 2014/0367134 A1* | 12/2014 | Phillips | B25B 23/147 |
| | | | 173/176 |
| 2014/0379136 A1* | 12/2014 | Schlegel | B25B 21/00 |
| | | | 700/275 |
| 2017/0180542 A1 | 6/2017 | Mian et al. | |
| 2018/0219993 A1 | 8/2018 | Mian et al. | |
| 2018/0231946 A1* | 8/2018 | Savo | G05B 19/4185 |
| 2019/0227528 A1* | 7/2019 | Abbott | B25F 5/00 |
| 2020/0252774 A1* | 8/2020 | Brault | H01M 50/296 |
| 2021/0243598 A1* | 8/2021 | Sheffield | G06Q 20/209 |
| 2021/0360775 A1* | 11/2021 | Smith | H05K 1/0243 |
| 2022/0167161 A1* | 5/2022 | Sheffield | H04W 12/08 |
| 2022/0354509 A1* | 11/2022 | Narducci | A61B 17/1626 |
| 2023/0262434 A1* | 8/2023 | Brault | H01M 50/204 |
| | | | 700/286 |
| 2024/0298157 A1* | 9/2024 | Brault | H01M 50/204 |

* cited by examiner

EXTERNALLY CONTROLLED INDICATOR

RELATED APPLICATIONS

This application claims the benefit of U.S. Provisional Patent Application No. 63/310,799, filed Feb. 16, 2022, the entire content of which is incorporated herein by reference.

SUMMARY

There is an increasing desire for devices to be interconnected such that data can be continuously transferred between a device and an external device. Devices, such as power tools, battery pack chargers, lights, etc., may include wireless communication capabilities for communicating with external devices, such as mobile phones, laptops, other devices of the same type, etc. In some cases, the device may provide an indication that the device is in communication with the external device. For example, an indicator may be illuminated when data is being transferred between the device, the external device, and/or another device. Given that data may be regularly or continuously exchanged between the device and the external device, the indicator may be frequently illuminated, which some users may find distracting and annoying. Additionally, a user may wish to control various features of the indicator, such as the color, frequency, and/or intensity of the illumination of the indicator. Further, prohibiting an indicator from providing any type of indication is beneficial for, among other things, data mining purposes. Accordingly, it would be advantageous to have a device that receives a command from an external device that prohibits an indicator from providing an indication when the device and the external device are interacting (for example, when data is being exchanged between the device and the external device) and, additionally in some cases, controlling a feature of the indicator.

Devices described herein include a housing, an indicator configured to provide an indication, a first electronic processer within the housing and configured to control operation of the indicator, and a wireless communication device including a second electronic processer. The wireless communication device is configured to wirelessly communicate with an external device, communicate with the first electronic processer to transfer data between the first electronic processer and the external device, receive a signal from the external device, and provide the signal to the first electronic processer. The first electronic processer is configured to prohibit, in response to receiving the signal from the wireless communication device, the indicator from providing the indication.

In some aspects, the device includes one of a group consisting of a power tool, a work light, a power tool battery pack, and a battery pack charger.

In some aspects, the wireless communication device includes an energy storage device.

In some aspects, the wireless communication device includes an antenna mounted to a printed circuit board ("PCB").

In some aspects, the wireless communication device is configured to wirelessly communicate with the external device via the antenna over a cellular network.

In some aspects, the second electronic processer is mounted on the PCB.

In some aspects, the wireless communication device is further configured to receive a second signal from the external device, and provide the second signal to the first electronic processer. The first electronic processer is configured to control the indicator to illuminate based on the second signal.

In some aspects, based on the second signal, the first electronic processer is configured to control at least one of a color of the indicator, a blinking rate of the indicator, and an undulation rate of the indicator.

In some aspects, based on the second signal, the first electronic processer is configured to control the indicator to illuminate at a preset time of day.

Systems described herein include a first device including an electronic processer and an indicator that is controlled by the electronic processer, an external device, and a wireless communication device that is removably coupled to the first device and includes a transceiver. The wireless communication device is configured to receive an operational parameter from the electronic processer, transmit, via the transceiver, the operational parameter to the external device, and receive a signal from the external device based on the operational parameter. The electronic processer is configured to control, based on the signal from the external device, the indicator to provide an indication.

In some aspects, the electronic processer is configured to control at least one of a color of the indicator, a blinking rate of the indicator, and an undulation rate of the indicator.

In some aspects, the first electronic processer is configured to control the indicator to illuminate at a certain time of day based on the signal.

In some aspects, the operational parameter is a type of power source providing power to the first device.

In some aspects, the first electronic processer is configured to control the indicator to halt indicating based on the signal when the operation parameter is a first type of power source.

In some aspects, the first electronic processer is configured to control the indicator to provide a first indication after the operational parameter is sent to the wireless communication device and before the wireless communication device transmits the operational parameter to the external device, the first electronic processer is configured to control the indicator to provide a second indication while the operational parameter is being transmitted to the external device, and the first electronic processer is configured to control the indicator to provide a third indication after the wireless communication device transmits the operational parameter to the external device and before the wireless communication device receives the signal from the external device.

In some aspects, the electronic processer is configured to determine the first device has been idle for a predetermined time and is configured to control the indicator to be OFF.

Wireless communication components described herein include a connector that electrically and mechanically connects to a host-side connector of a device, and a printed circuit board ("PCB") including a first electronic processer and a transceiver. The first electronic processer is configured to wirelessly communicate, via the transceiver, with an external device, communicate with a second electronic processer of the device to transfer data between the second electronic processer and the external device, receive, via the transceiver, a signal from the external device, and provide the signal to the second electronic processer to prohibit an indicator from providing an indication.

In some aspects, the first electronic processer wirelessly communicates with the second electronic processer via the transceiver.

Methods described herein for controlling an indicator of a device include wirelessly communicating, by a wireless communication device of the device, with an external device, communicating with an electronic processer to transfer data between the electronic processer and the external device, receiving a signal from the external device, and providing the signal to the electronic processor to prohibit the indicator from providing an indication.

In some aspects, the device includes one of a group consisting of a power tool, a work light, a power tool battery pack, and a battery pack charger.

In some aspects, the wireless communication device includes an energy storage device.

In some aspects, wirelessly communicating with the external device includes wirelessly communicating over a cellular network.

In some aspects, the method further includes receiving a second signal from the external device, and providing the second signal to the electronic processor to control the indicator to illuminate based on the second signal.

In some aspects, the method further includes controlling at least one of a color of the indicator, a blinking rate of the indicator, and an undulation rate of the indicator.

In some aspects, the method further includes controlling the indicator to illuminate at a preset time of day.

Methods described herein for controlling an indicator of a device within a system include receiving, at a wireless communication device, an operational parameter from an electronic processor, transmitting, via a transceiver of the wireless communication device, the operational parameter to an external device, receiving, at the wireless communication device, a signal from the external device based on the operational parameter, and controlling the indicator to provide an indication based on the signal.

In some aspects, controlling the indicator to provide the indication includes controlling at least one of a color of the indicator, a blinking rate of the indicator, and an undulation rate of the indicator.

In some aspects, the method further includes controlling the indicator to illuminate at a preset time of day.

In some aspects, the operational parameter is a type of power source providing power to the device.

In some aspects, the method further includes controlling the indicator to halt indicating based on the signal when the operation parameter is a first type of power source.

In some aspects, the method further includes controlling the indicator to provide a first indication after the operational parameter is received by the wireless communication device and before the wireless communication device transmits the operational parameter to the external device, controlling the indicator to provide a second indication while the operational parameter is being transmitted to the external device, and controlling the indicator to provide a third indication after the wireless communication device transmits the operational parameter to the external device and before the wireless communication device receives the signal from the external device.

In some aspects, the method further includes determining the device has been idle for a predetermined time, and controlling the indicator to be OFF.

Before any embodiments are explained in detail, it is to be understood that the embodiments are not limited in application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Embodiments described herein relate to a device that receives a command from an external device that prohibits, for example, the illumination of an indicator when data is exchanged between the device and the external device.

Figure 1:
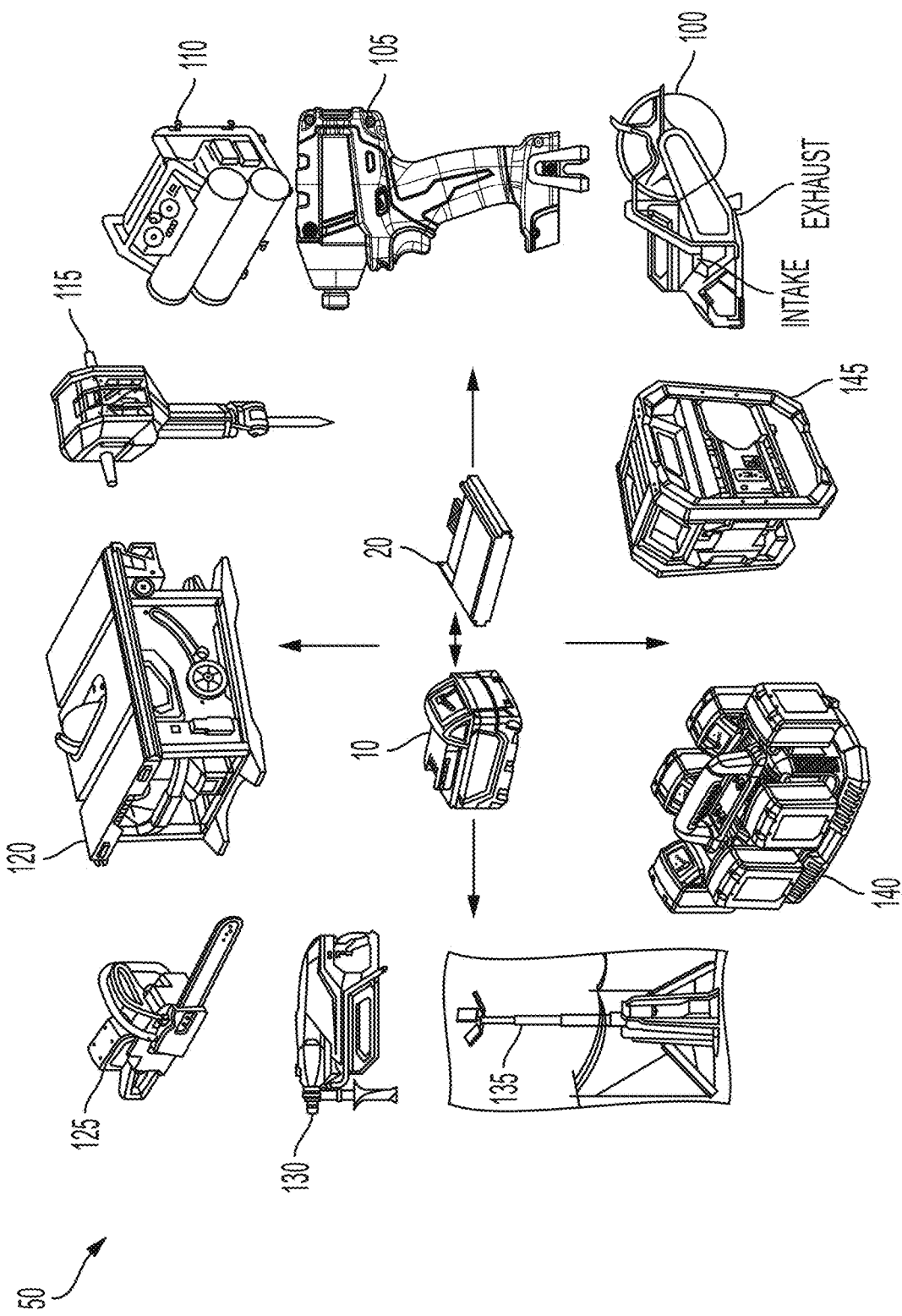
FIG. 1 illustrates wireless communication components within a system of electrical devices, according to embodiments described herein.

FIG. 1 illustrates a system 50 for wirelessly enabling electrical devices. The system 50 includes wireless communication devices and various electrical devices enabled to be wirelessly controlled via at least one of the wireless communication devices. For example, the wireless communication devices include a battery pack 10 and an insertable wireless communication component 20. When coupled to an electrical device, the wireless communication device enables wireless communication between the electrical device and an external device 505 (see FIG. 5). In some embodiments, the battery pack 10 is not a wireless communication device on its own, and is coupled with the wireless communication component 20.

The electrical devices include hand-held devices (i.e., devices configured to be supported by an operator during use) and non-hand-held devices (i.e., devices supported on a work surface or support rather than by the operator during use). Such devices include motorized power tools (e.g., a drill, an impact driver, an impact wrench 105, a rotary hammer, a hammer drill, a saw [e.g., a circular saw, a cut-off saw 100, a reciprocating saw, a miter saw, a table saw 120, etc.], a core drill 130, a breaker 115, a demolition hammer, a compressor 110, a pump, etc.), outdoor tools (e.g., a chain saw 125, a string hammer, a hedge trimmer, a blower, a lawn mower, etc.), drain cleaning and plumbing tools, construction tools, concrete tools, other motorized devices (e.g., vehicles, utility carts, wheeled and/or self-propelled tools, etc.), etc., non-motorized electrical devices (e.g., a power supply 145, a light 135, a battery pack charger 140, a generator, etc.), and an adapter that is configured to be positioned between a power tool and a battery pack, such as adapter 530 (see FIG. 5).

In some embodiments, the electrical devices may include integrated wireless communication devices. For example, wireless communication capabilities may be built into the electrical device such that it may wirelessly communicate with the external device. In other embodiments, the wireless communication device is insertable into and detachable from the electrical devices. Electrical devices/wireless communication devices 10, 20 may be referred to herein as host devices.

Figure 2:
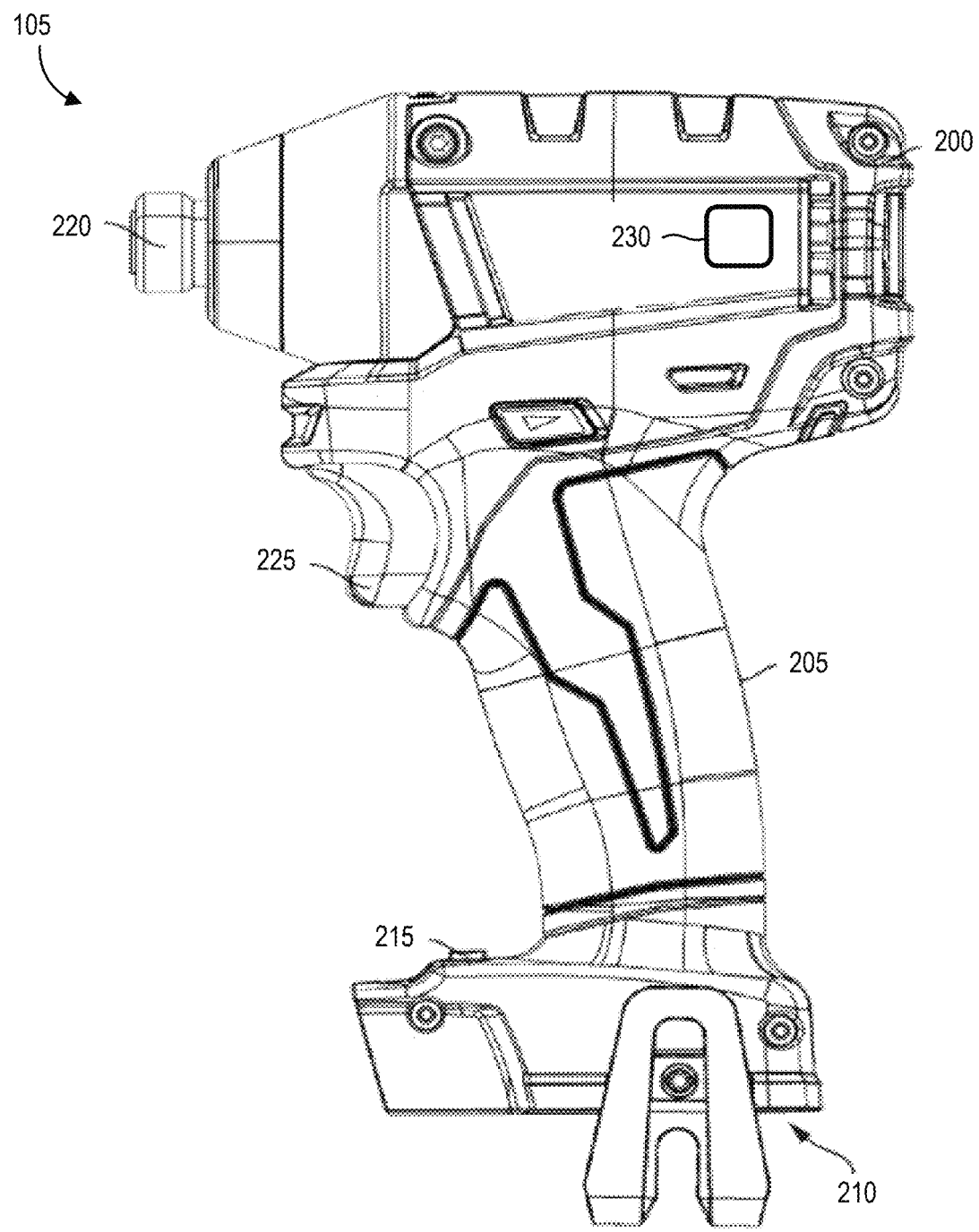
FIG. 2 illustrates a host device (e.g., a power tool device) of the communication system of FIG. 1, according to embodiments described herein.

FIG. 2 illustrates a host device as the power tool 105, and in particular an impact wrench. Although the electrical device illustrated in FIG. 2 is an impact wrench and may be referred to herein as a power tool 105, embodiments described herein similarly apply to and can be used in conjunction with a variety of electrical devices. The power tool 105 is configured to perform one or more specific tasks (e.g., drilling, cutting, fastening, pressing, lubricant application, sanding, heating, grinding, bending, forming, impacting, polishing, lighting, etc.). For example, an impact wrench is associated with the task of generating a rotational output (e.g., to drive a bit). This task may be referred to as the primary function of the power tool 105.

As shown in FIG. 2, the power tool 105 includes a main body 200 (i.e., a motor housing portion), a handle portion 205, a battery pack receiving portion 210 (e.g., to receive the battery pack 10), a selection switch 215, an output drive device or mechanism 220, a trigger 225 (or other actuator), and an indicator 230. The power tool 105 further includes a motor 640 (see FIG. 6) within the main body 200 of the housing. The motor 640 includes a rotor and a stator. The rotor is coupled to a motor shaft arranged to produce an output outside of the housing via the output drive device or mechanism 220. The housing of the power tool 105 (e.g., the main body 200, the handle 205, and the battery pack receiving portion 210) are composed of, for example, a durable and light-weight plastic material. The drive device 220 is composed of a metal (e.g., steel). The drive device 220 on the power tool 105 of FIG. 2 is a socket. However, each power tool 105 may have a different drive device 220 specifically designed for the task associated with the power tool 105. For example, the drive device 220 for a power drill may include a bit driver or chuck, while the drive device 220 for a pipe cutter may include a blade or blade holder. The selection switch 215 is configured to select an operation mode for the power tool 105. Different operation modes may have different speed or torque levels, or may control the power tool 105 based on different sets of parameters. In some embodiments, the selection switch 215 is a mode pad. The mode pad allows a user to select a mode of the power tool 105 and indicates to the user the currently selected mode of the power tool 105.

The indicator 230 includes one or more light-emitting diodes ("LED"), a display screen, and/or electronic paper (e.g., "e-ink"). The indicator 230 can be configured to display conditions of, or information associated with, the power tool 105. For example, the indicator 230 is configured to indicate that data is being transmitted between the power tool 105 (e.g., via the wireless communication device 10, 20) and the external device 505, measured electrical characteristics of the power tool 105, the status of the power tool 105, etc. In some embodiments, there may be a plurality of indicators that are configured to display conditions of, or information associated with, the power tool 105. The indicator 230 may also include elements to convey information to a user through audible or tactile outputs. In some embodiments, the external device 505 may configure illumination parameters of the indicator 230. For example, the external device 505 may send a command to the wireless communication component 20 (coupled to the power tool 105) to prohibit the indicator 230 from illuminating when data is being transferred between the wireless communication component 20 and the external device 505. In some embodiments, the indicator 230 may be adjacent to, part of, or share functionality with another element of the power tool 105. For example, the indicator 230 may be adjacent to, part of, or share functionality with the selection switch 215, a work light of the power tool 105, or another indicator of the power tool 105.

Figure 3:
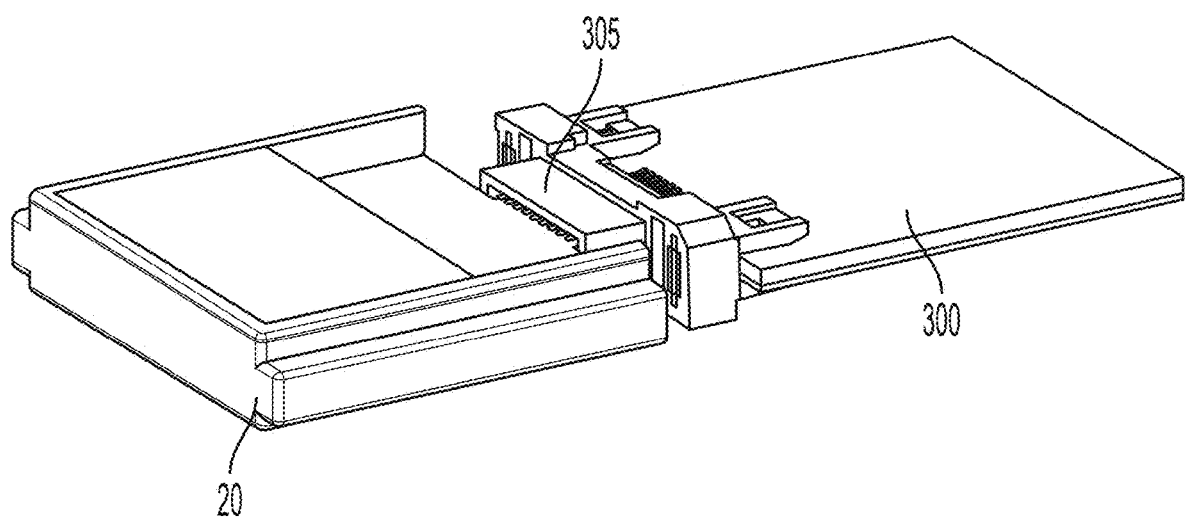
FIG. 3 is a perspective view of a wireless communication component electrically and physically coupled to a printed circuit board of one of the electrical devices of FIG. 1, according to embodiments described herein.

FIG. 3 is a perspective view of the wireless communication component 20 electrically and physically coupled to a printed circuit board ("PCB") 300 of an electrical device, such as the power tool 105. In some embodiments, the PCB 300 may be housed in the main body 200 of the power tool 105. The main body 200 may include an insertable device compartment that holds the PCB 300. The PCB 300 is coupled (physically, electrically, or both) to a first connector 305 (i.e., a host-side connector) that connects to the wireless communication component at a wireless communication component connector. For example, the first connector 305 may include contacts electrically coupled to conductive traces of the PCB 300, and physically secured to an end of the PCB 300 facing an outer portion of the compartment. In some embodiments, the wireless communication component connector is a male terminal and the first connector 305 is a female terminal that receives the wireless communication component connector. The compartment may also receive the wireless communication component 20 when inserted into the compartment. The wireless communication component 20 extends parallel to the PCB 300. In some embodiments, the wireless communication component 20 is integrated into the power tool 105 and is unable to be removed without damaging the power tool 105. In some of the embodiments, the wireless communication component 20 may include the indicator 230.

In some embodiments, the power tool 105 includes both an integrated wireless communication device and an insertable device compartment configured to receive an insertable wireless communication device. In some embodiments, these two wireless communication devices of the power tool 105 may use different communication protocols to allow the power tool 105 to communicate with the external device 505 and/or a server 525 (see FIG. 5). For example, the integrated wireless communication device may allow for short-range radio communication (e.g., Bluetooth®) with the external device 505 while the insertable wireless communication device may allow for long-range radio communication (e.g., cellular communication over a cellular network with the server, communication via a WiFi-transceiver, communication via a GPS transceiver, and/or the like). Alternatively or additionally, the wireless communication device may communicate via audible, ultrasonic, and/or light/infrared/laser based methods.

Figure 4:
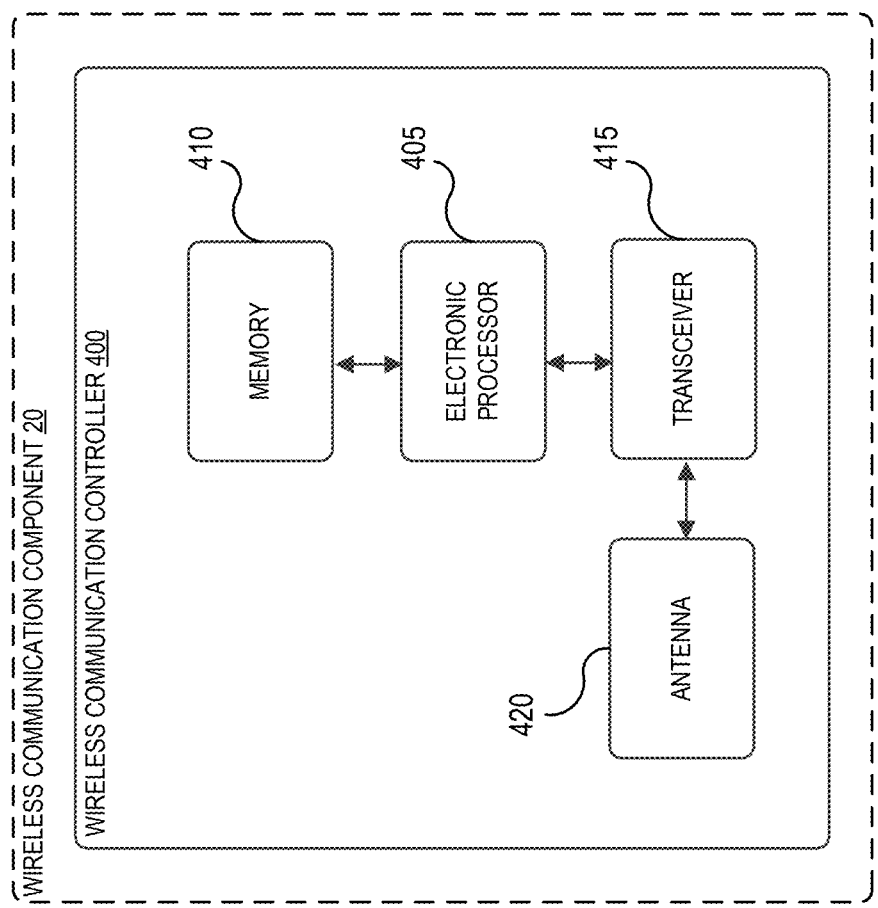
FIG. 4 illustrates a block diagram of the wireless communication component of FIG. 2, according to embodiments described herein.

FIG. 4 illustrates a block diagram of the wireless communication component 20, according to some embodiments. As shown in FIG. 4, the wireless communication component 20 includes a wireless communication controller 400. The wireless communication component 20 enables an electronic processor 655 (see FIG. 6) of the power tool 105 to wirelessly communicate with the external device 505 and/or the server 525. In some embodiments, wireless communication includes transmitting power tool data (e.g., power tool usage data, configuration data, maintenance data, firmware update, a pairing message/instruction for Bluetooth® enabled devices, etc.) and receiving power tool configuration data (e.g., settings for operating the power tool 105 in a particular mode). The wireless communication component 20 is also configured to receive commands to remotely control power tool components (e.g., prohibit illumination of the indicator 230, turn on a work light, lock the power tool 105, turn on a vacuum, adjust the brightness of a light 135, reset the power tool 105, lock and/or unlock the power tool 105, etc.). The wireless communication component 20 may also enable a location of the power tool 105 to be determined and tracked/recorded by the external device 505 and/or the server 525 (e.g., by sending or broadcasting a one-directional beacon message). In some embodiments, the wireless communication controller 400 may be included in the battery pack 10 that is coupled to the power tool 105, such that the battery pack 10 is the wireless communication device.

As shown in FIG. 4, the wireless communication controller 400 includes an electronic processor 405, a memory 410, a transceiver 415 (e.g., a radio transceiver), and an antenna 420 mounted on a PCB of the wireless communication component 20. In some embodiments, the antenna 420 is a monopole antenna (e.g., a ground plane antenna) that includes a conductor (e.g., a chip antenna, a rod-shaped conductor, etc.) mounted to the PCB of the wireless communication component 20 and serving as a first portion of the antenna 420. In some embodiments, the antenna 420 is a laser direct structuring ("LDS") antenna that includes a metalized structure printed onto a surface of a plastic housing of the wireless communication component 20 or printed onto an end cap of the wireless communication component. In some embodiments, the wireless communication component 20 includes an energy storage component for providing power to the electronic processor 405, the memory 410, the transceiver 415, and the antenna 420. For example, the energy storage component may be a coin cell battery coupled to the PCB of the wireless communication component.

The antenna 420, the transceiver 415, and the electronic processor 405 operate together to send and receive wireless messages between the external device 505 (and/or the server 525) and the electronic processor 655 of the power tool 105. The memory 410 stores instructions to be implemented by the electronic processor 405 and/or may store data related to communications between the power tool 105 and the external device 505 (and/or the server 525), or the like. The electronic processor 405 may control wireless communications between the power tool 105 and the external device 505 (and/or the server 525). For example, the electronic processor 405 buffers incoming and/or outgoing data, communicates with the electronic processor 655 of the power tool 105, and determines the communication protocol and/or settings to use in wireless communications. In other words, the electronic processor 405 is configured to receive data from the power tool electronic processor 655 and relay the information to the external device 505 (and/or the server 525) via the transceiver 415 and the antenna 420. In a similar manner, the electronic processor 405 is configured to receive information (e.g., configuration and programming information) from the external device 505 (and/or the server 525) via the transceiver 415 and the antenna 420 and relay the information to the power tool electronic processor 655. In some embodiments, the electronic processor 405 functions as one or more radio transceivers (i.e., the functionality of the transceiver 415 may be included in the electronic processer 405 in some embodiments). In other embodiments, the wireless communication component 20 may include multiple separate transceivers 415 (e.g., radio transceivers) that each include their own electronic processer or that communicate with the electronic processer 405 to allow the wireless communication component 20 to use different communication protocols to communicate via the antenna 420.

In some embodiments, the transceiver 415 is a Bluetooth® transceiver. The Bluetooth® transceiver 415 communicates with the external device 505 employing the Bluetooth® protocol. Therefore, in such an embodiment, the external device 505 and the power tool 105 are within a communication range (i.e., in proximity) of each other while they exchange data. In other embodiments, the wireless communication component 20 communicates using other protocols (e.g., Wi-Fi, cellular protocols, etc.) over a different type of wireless network. For example, the wireless communication component 20 may include a Wi-Fi transceiver configured to communicate via Wi-Fi through a wide area network such as the Internet or a local area network, or to communicate through a piconet (e.g., using infrared or NFC communications). As another example, the insertable wireless communication component 20 may include a cellular communication transceiver configured to communicate over a cellular network. The communication via the insertable wireless communication component 20 may be encrypted to protect the data exchanged between the power tool 105 and the external device 505 (or network) from third parties.

Figure 5:
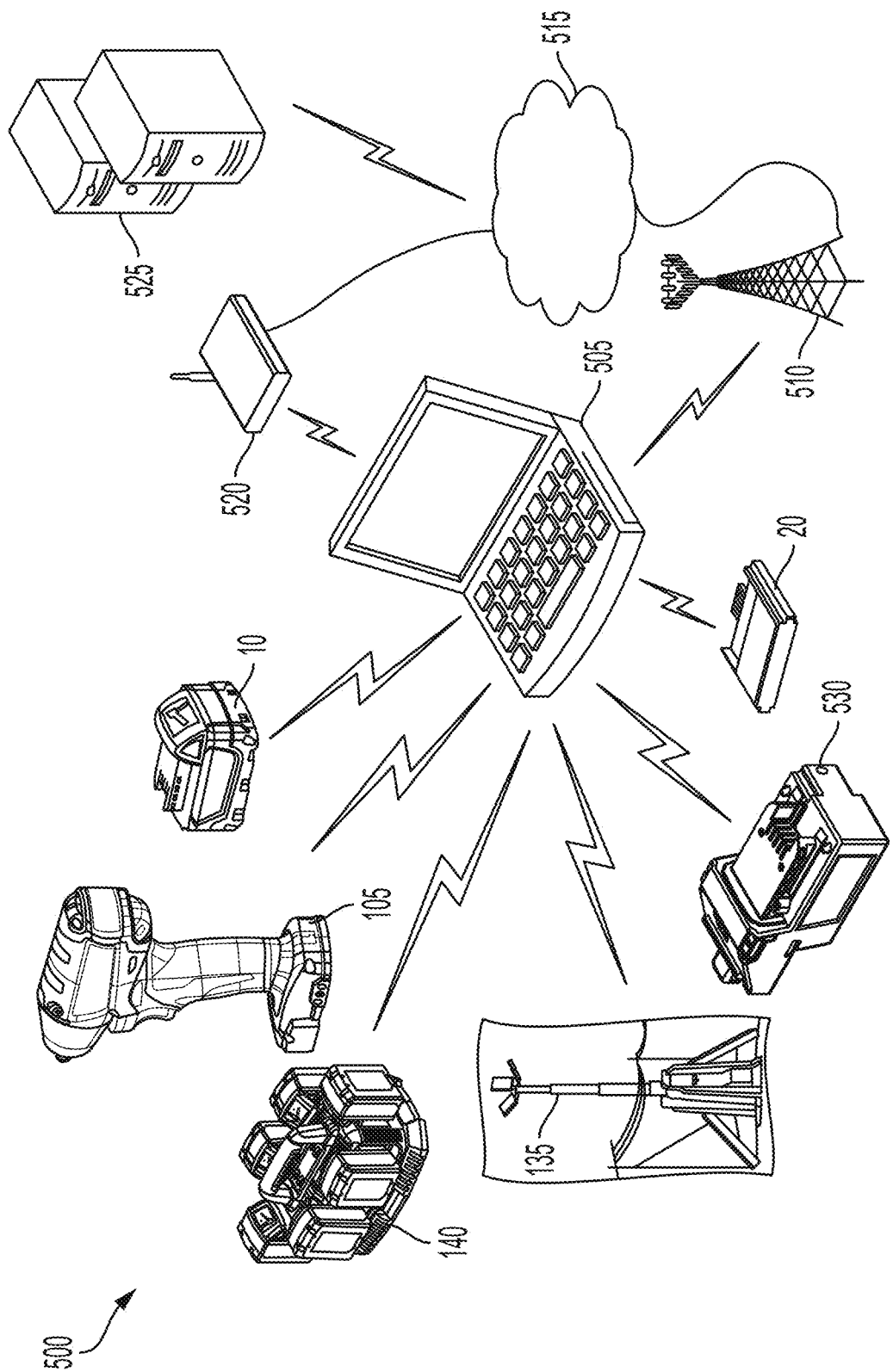
FIG. 5 illustrates a communication system, according to embodiments described herein.

FIG. 5 illustrates a communication system 500. The communication system 500 includes electrical devices (e.g., the power tool 105, the light 135, the battery pack charger 140, and the adapter 530), wireless communication devices (e.g., the battery pack 10 and the wireless communication component 20), and the external device 505. As previously discussed, the wireless communication component 20 may be integrated into the electrical devices such that the wireless communication controller 400 is integrated in the electrical device. For example, the power tool 105 may wirelessly communicate with the external device 505 via the wireless communication controller 400 while they are within a communication range of each other. In some embodiments, the wireless communication controller 400 of the power tool 105 may wirelessly communicate with a wireless communication controller of another device, such as the light 135, to transmit data from the external device 505 to the light 135. For example, a mesh network may be established such that the external device 505 may wirelessly communicate with devices that are outside of a wireless range, via another device that is within a wireless range of the external device 505.

The wireless communication component 20 may exchange data with the external device 505 such as power tool status, power tool operation statistics, power tool identification, stored power tool usage information, power tool maintenance data, etc., The external device 505 can also transmit data to the power tool 105 for power tool configuration, firmware updates, or to send commands (e.g., prohibit indicator 230 from illuminating when data is exchanged, turn on a work light, lock the power tool 105, etc.). The external device 505 also allows a user to set operational parameters, safety parameters, and select tool modes for the power tool device 105 (e.g., adjust illumination parameters [e.g., frequency of illumination, intensity of illumination, color of illumination, etc.], adjust operating modes or parameters of the power tool 105 such as motor speed, motor ramp-up, torque, etc.). The external device 505 may also communicate with the remote server 525 and may receive configuration and/or settings for the power tool 105, or may transmit operational data or other power tool status information to the remote server 525.

Figure 12:
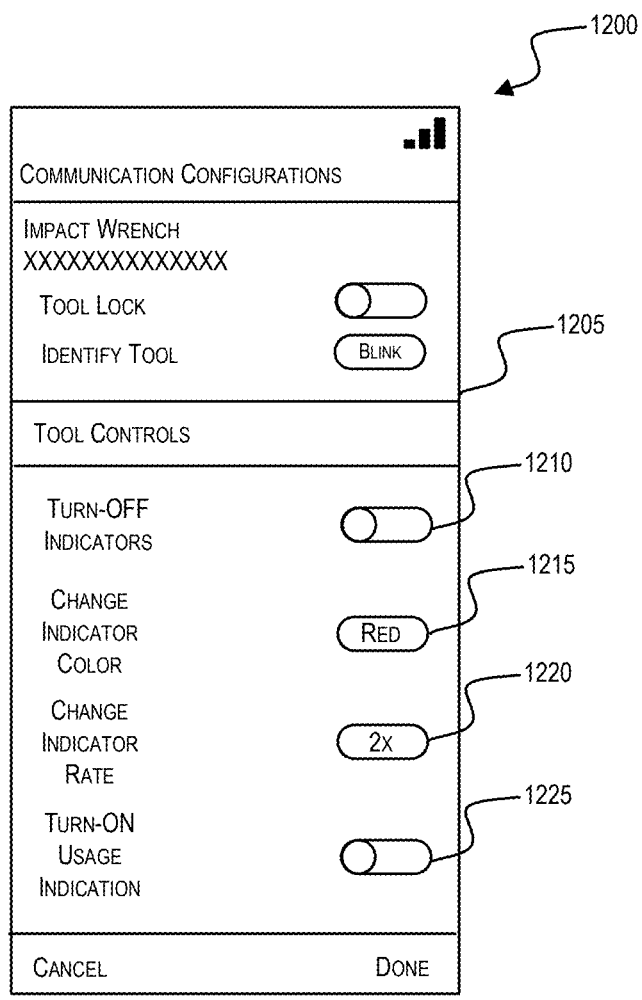
FIG. 12 illustrates an interface of an external device for controlling the host device, according to embodiments described herein.

The external device 505 is, for example, a smart phone, a laptop computer, a tablet computer, a cell phone, a gateway hub, or another electronic device capable of communicating wirelessly with the wireless communication component 20 and providing a user interface 1200 including a communication configuration page 1205 (see FIG. 12). In some embodiments, the external device 505 provides the interface 1200 and allows a user to access and configure the power tool 105. The external device 505 can receive user inputs to determine operational parameters, enable or disable features, etc. The communication configuration page 1205 of the external device 505 provides an easy-to-use interface for the user to control and customize operation of the power tool 105.

As shown in FIG. 5, the external device 505 can share the data obtained from the power tool 105, via the wireless communication component 20, with the remote server 525 connected through a network 515. The server 525 may be used to store the data obtained from the external device 505, provide additional functionality and services to the user, or a combination thereof. In some embodiments, storing the information on the server 525 allows a user to access the information from a plurality of different locations. In some embodiments, the server 525 collects information from various users regarding their devices and provides statistics or statistical measures to the user based on information obtained from the different devices. The network 515 may include various networking elements (routers 520, hubs, switches, cellular towers 510, wired connections, wireless connections, etc.) for connecting to, for example, the Internet, a cellular data network, a local network, or a combination thereof as previously described. In some embodiments, the wireless communication component 20 may receive a command directly from the server 525 without the user configuring such a command via the external device 505.

Figure 6:
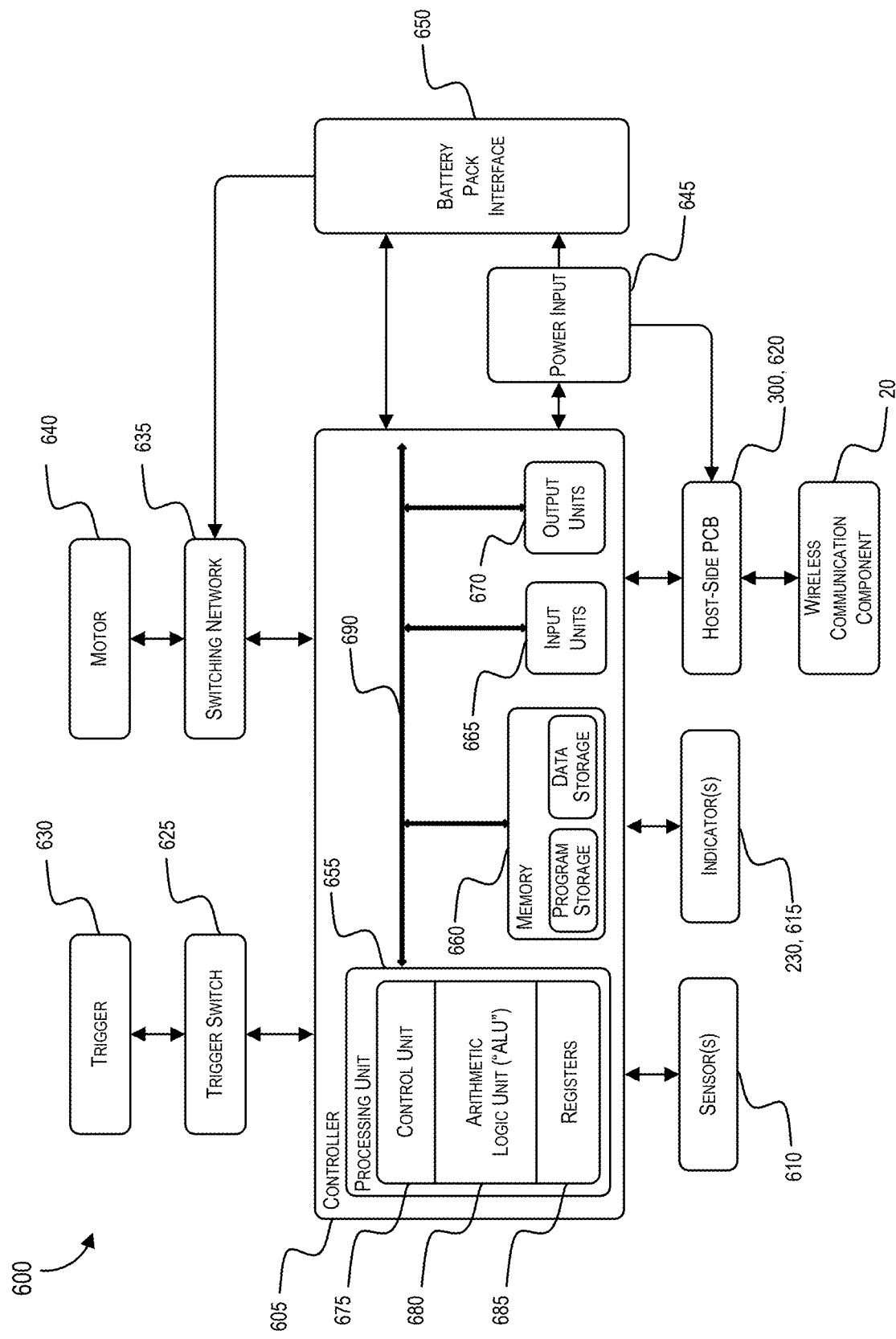
FIG. 6 illustrates a control system for the host device of FIG. 4, according to embodiments described herein.

FIG. 6 illustrates a block diagram of a control system 600 of the power tool 105 of FIG. 2. The control system 600 includes a controller 605. The controller 605 is electrically and/or communicatively connected to a variety of modules or components of the power tool 105. For example, the illustrated controller 605 is electrically connected to sensor(s) 610, indicator(s) 230, 615, a host-side PCB 300, 620 (connected to the wireless communication component 20), a trigger switch 625 (connected to a trigger 630), a switching network 635 (connected to a motor 640), a power input 645, and a battery pack interface 650. The controller 605 includes a combination of hardware and software that are operable to, among other things, control the operation of the power tool 105.

The controller 605 includes a plurality of electrical and electronic components that provide power, operational control, and protection to the components and modules within the controller 605 and/or power tool 105. For example, the controller 605 includes, among other things, a processing unit 655 (e.g., a microprocessor, a microcontroller, an electronic controller, an electronic processer, or another suitable programmable device), a memory 660, input units 665, and output units 670. The processing unit 655 includes, among other things, a control unit 675, an arithmetic logic unit ("ALU") 680, and a plurality of registers 685 (shown as a group of registers in FIG. 6), and is implemented using a known computer architecture (e.g., a modified Harvard architecture, a von Neumann architecture, etc.). The processing unit 655, the memory 660, the input units 665, and the output units 670, as well as the various modules or circuits connected to the controller 605 are connected by one or more control and/or data buses (e.g., common bus 690). The control and/or data buses are shown generally in FIG. 6 for illustrative purposes. The use of one or more control and/or data buses for the interconnection between and communication among the various modules, circuits, and components would be known to a person skilled in the art in view of the embodiments described herein.

The memory 660 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 655 is connected to the memory 660 and executes software instructions that are capable of being stored in a RAM of the memory 660 (e.g., during execution), a ROM of the memory 660 (e.g., on a generally permanent basis), or another non-transitory computer readable medium such as another memory or a disc. Software included in the implementation of the power tool 105 can be stored in the memory 660 of the controller 605. The software includes, for example, firmware, one or more applications, program data, filters, rules, one or more program modules, and other executable instructions. The controller 605 is configured to retrieve from the memory 660 and execute, among other things, instructions related to the control processes and methods described herein. In other constructions, the controller 605 includes additional, fewer, or different components.

The battery pack interface 650 includes a combination of mechanical components (e.g., rails, grooves, latches, etc.) and electrical components (e.g., one or more terminals) configured to and operable for interfacing (e.g., mechanically, electrically, and communicatively connecting) the power tool 105 with a battery pack (e.g., the battery pack 10). For example, power provided by the battery pack 10 to the power tool 105 is provided through the battery pack interface 650 to the power input module 645. The power input module 645 includes combinations of active and passive components to regulate or control the power received from the battery pack 10 prior to power being provided to the controller 605. The battery pack interface 650 also supplies power to the FET switching network 635 to be switched by the switching FETs to selectively provide power to the motor 640 for driving an output of the power tool 105.

Additionally, the power input module 645 controls and regulates power received through the battery pack interface 650 and provides the power to the host-side PCB 300, 620. For example, the host-side PCB 300, 620 transmits power to the wireless communication component 20 from the battery pack 10 when the battery pack is coupled to the power tool 105. In some embodiments, the battery pack interface 650 also includes, for example, a communication line for providing a communication line or link between the controller 605 and the battery pack 10, in the case, for example, that the battery pack 10 is the wireless communication device.

The sensors 610 are coupled to the controller 605 and communicate to the processing unit 655 various signals indicative of different parameters of the power tool 105 or the motor 640. The sensors 610 include, for example, one or more current sensors, one or more voltage sensors, one or more temperature sensors, one or more speed sensors, one or more Hall Effect sensors, one or more motion sensors etc. For example, the speed of the motor 640 can be determined using a plurality of Hall Effect sensors to sense the rotational position of the motor 640. In some embodiments, the processing unit 655 controls the switching network 635 in response to signals received from the sensors 610. For example, if the processing unit 655 determines that the speed of the motor 640 is increasing too rapidly based on information received from the sensors 610, the processing unit 655 may adapt or modify the active switches or switching sequence within the switching network 635 to reduce the speed of the motor 640. Data obtained via the sensors 610 may be transmitted to the external device 505 via the wireless communication component 20.

The trigger 630 is coupled to the trigger switch 625. The trigger 630 moves in a first direction towards the handle 205 when the trigger 630 is depressed by the user. The trigger 630 is biased (e.g., with a spring) such that it moves in a second direction away from the handle 204 when the trigger 630 is released by the user. When the trigger 630 is depressed by the user, the trigger switch 625 becomes activated, which causes the motor 640 to be energized. When the trigger 630 is released by the user, the trigger switch 625 becomes deactivated, and the motor 640 is de-energized.

The indicators 230, 615 are also coupled to the processing unit 655 and receive control signals from the processing unit 655 to turn ON and OFF or otherwise convey information based on different states of the power tool 105 and/or input from the external device 505 via the wireless communication component 20. The indicators 230, 615 include, for example, one or more light-emitting diodes ("LEDs"), or a display screen. The indicators 230, 615 can be configured to display conditions of, or information associated with, the power tool 105. For example, one or more of the indicators 230, 615 are configured to indicate that data is being transferred between the power tool 105 and the external device 505 via a constant illumination, flashing at a preset interval, or illuminating with a soft undulation. As another example, one or more of the indicators 230, 615 may provide a visual indication that data is ready to be sent by the wireless communication component 20 but that the wireless communication component 20 has not yet synched with the external device 505. The visual indication for not yet synched data may be a constant illumination in a predetermined color (e.g., orange). As another example, the indicators 230, 615 may provide a visual indication that data is uploading to the external device 505, via the wireless communication component 20. The visual indication for uploading data may be a slow undulation in a predetermined color (e.g., blue). As another example, the indicators 230, 615 may provide a visual indication that data is uploaded, via the wireless communication component 20, to the external device 505. The visual indication for indicating that data is uploaded may be a constant illumination in a predetermined color (e.g., green). The indicators 230, 615 may also include elements to convey information to a user through audible or tactile outputs. In some embodiments, the controller 605 may determine that the power tool 105 is idle and provide a visual indication (e.g., keeping the visual indicators 230, 615 OFF). The power tool 105 may be considered to be idle based on at least one of a sensor input (e.g., no motion detected), an elapsed period since the wireless communication component 20 has transferred data, an elapsed period since the power tool 105 has been operated, and pre-configured hours that the power tool 105 is OFF (e.g., configured via the external device 505).

In some embodiments, the indicators 230, 615 may be configured to illuminate at certain times of the day. For example, the indicators 230, 615 may be configured (e.g., via the wireless communication component 20) to illuminate based on a scheduled time of day (e.g., at 9 am, 10 am, 11 am, 12 pm, etc.) or a daily event (e.g., sunrise or sunset). In some embodiments, the indicators 230, 615 may be configured to provide work light at night (e.g., after sunset or after, for example, 5 pm). In some embodiments, the indicators 230, 615 may be configured to illuminate to help a user locate the power tool 105. For example, the indicators 230, 615 may be configured to illuminate at 7 am when a user's workday begins.

Additionally, as previously described herein, the power tool 105 includes the host-side PCB 300, 620 that is configured to be electrically coupleable to the wireless communication component 20. In some embodiments, the host-side PCB 300, 620 includes an energy storage device separate from the battery pack 10 of the power tool 105. Because the energy storage device is separate from the battery pack 10 of the power tool 105, the energy storage device may be referred to as a backup power supply. The energy storage device may be a coin cell battery. The energy storage device may alternatively be another type of battery cell, a capacitor, or another energy storage device. In some embodiments, the energy storage device is configured to provide power to the wireless communication component 20 when the wireless communication component 20 is inserted into the power tool 105.

The wireless communication component 20 includes the wireless communication controller 400, described above in FIG. 4, for communicating with the external device 505. As described above, the wireless communication component 20 may receive a command from the external device 505. For example, the wireless communication component 20 may receive a command to prohibit the illumination of an indicator 230, 615 when the power tool 105 is communicating with the external device 505. The wireless communication component 20 communicates the command to the processing unit 655, and the processing unit 655 controls the indicator 230, 615 accordingly.

Figure 7:
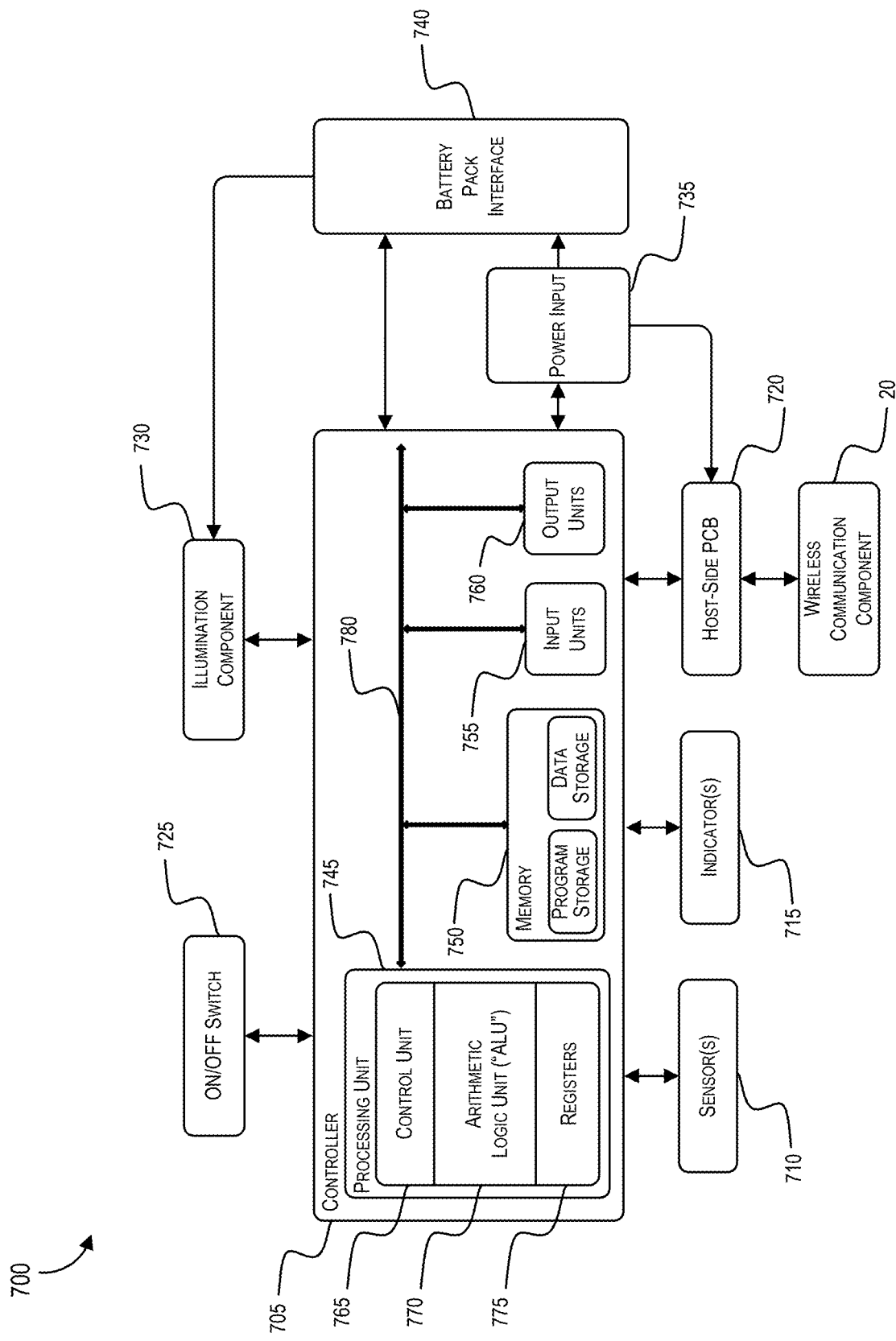
FIG. 7 illustrates a control system for another host device of FIG. 1, according to embodiments described herein.

FIG. 7 illustrates a block diagram of a control system 700 of the light 135 of FIG. 1. The control system 700 includes a controller 705. The controller 705 is electrically and/or communicatively connected to a variety of modules or components of the light 135. For example, the illustrated controller 705 is electrically connected to sensor(s) 710, indicator(s) 715, a host-side PCB 720 (connected to the wireless communication component 20), a ON/OFF switch 725, an illumination component 730, a power input 735, and a battery pack interface 740. The controller 705 includes a combination of hardware and software that are operable to, among other things, control the operation of the illumination component 730 of the light 135.

The controller 705 includes a plurality of electrical and electronic components that provide power, operational control, and protection to the components and modules within the controller 705 and/or light 135. For example, the controller 705 includes, among other things, a processing unit 745 (e.g., a microprocessor, a microcontroller, an electronic controller, an electronic processer, or another suitable programmable device), a memory 750, input units 755, and output units 760. The processing unit 745 includes, among other things, a control unit 765, an arithmetic logic unit ("ALU") 770, and a plurality of registers 775 (shown as a group of registers in FIG. 7), and is implemented using a known computer architecture (e.g., a modified Harvard architecture, a von Neumann architecture, etc.). The processing unit 745, the memory 750, the input units 755, and the output units 760, as well as the various modules or circuits connected to the controller 705 are connected by one or more control and/or data buses (e.g., common bus 780). The control and/or data buses are shown generally in FIG. 7 for illustrative purposes. The use of one or more control and/or data buses for the interconnection between and communication among the various modules, circuits, and components would be known to a person skilled in the art in view of the embodiments described herein.

The memory 750 is a non-transitory computer readable medium and includes, for example, a program storage area and a data storage area. The memory 750 and the processing unit 745 function similarly to the memory 660 and processing unit 655 of FIG. 6.

The battery pack interface 740 includes a combination of mechanical components (e.g., rails, grooves, latches, etc.) and electrical components (e.g., one or more terminals) configured to and operable for interfacing (e.g., mechanically, electrically, and communicatively connecting) the light 135 with a battery pack (e.g., the battery pack 10). For example, power provided by the battery pack 10 to the light 135 is provided through the battery pack interface 740 to the power input module 735. The power input module 735 includes combinations of active and passive components to regulate or control the power received from the battery pack 10 prior to power being provided to the controller 705. The battery pack interface 740 also supplies power to the illumination component 730.

Additionally, the power input module 735 controls and regulates power received through the battery pack interface 740 and provides the power to the host-side PCB 720. For example, the host-side PCB 720 transmits power to the wireless communication component 20 from the battery pack 10 when the battery pack is coupled to the light 135. In some embodiments, the battery pack interface 740 also includes, for example, a communication line for providing a communication line or link between the controller 705 and the battery pack 10, in the case, for example, that the battery pack 10 is the wireless communication device.

The sensors 710 are coupled to the controller 605 and communicate to the processing unit 745 various signals indicative of different parameters of the light 135. The sensors 710 include, for example, one or more temperature sensors, one or more gyroscopes, one or more light intensity sensor, etc. For example, the ambient lighting can be determined via the light intensity sensor. In some embodiments, the processing unit 745 controls the illumination component 730 in response to signals received from the sensors 710. For example, if the processing unit 745 determines that the ambient light is above a threshold based on information received from the sensors 610, the processing unit 745 may dim the illumination component 730 to save power. Data obtained via the sensors 710 may be transmitted to the external device 505 via the wireless communication component 20.

The ON/OFF switch 725 controls operation of the illumination component 730. For example, a user may depress the ON/OFF switch 725 to illuminate the illumination component 730. In some embodiments, the ON/OFF switch 725 may be able to control the intensity of the illumination component 730.

The indicators 715 are also coupled to the processing unit 745 and receive control signals from the processing unit 745 to turn ON and OFF or otherwise convey information based on different states of the light 135 and/or input from the external device 505 via the wireless communication component 20. The indicators 715 include, for example, one or more light-emitting diodes ("LEDs"), or a display screen. The indicators 715 can be configured to display conditions of, or information associated with, the light 135. For example, one or more of the indicators 715 are configured to indicate that data is being transferred between the light 135 and the external device 505 via a constant illumination, flashing at a preset interval, or illuminating with a soft undulation. As another example, one or more of the indicators 715 may provide a visual indication that data is ready to be sent by the wireless communication component 20 but that the wireless communication component 20 has not yet synched with the external device 505. The visual indication for not yet synched data may be a constant illumination in a predetermined color (e.g., orange). As another example, the indicators 715 may provide a visual indication that data is uploading to the external device 505, via the wireless communication component 20. The visual indication for uploading data may be a slow undulation in a predetermined color (e.g., blue). As another example, the indicators 715 may provide a visual indication that data is uploaded, via the wireless communication component 20, to the external device 505. The visual indication for indicating that data is uploaded may be a constant illumination in a predetermined color (e.g., green). The indicators 715 may also include elements to convey information to a user through audible or tactile outputs. In some embodiments, the controller 705 may determine that the light 135 is idle and provide a visual indication (e.g., keeping the visual indicators 715 OFF). The light 135 may be considered to be idle based on at least one of a sensor input (e.g., no power provided to the illumination component 730, an elapsed period since the wireless communication component 20 has transferred data, an elapsed period since the light 135 has been operated, and pre-configured hours that the light 135 is OFF (e.g., configured via the external device 505).

In some embodiments, the indicators 715 may be configured to illuminate at certain times of the day. For example, the indicators 715 may be configured (e.g., via the wireless communication component 20) to illuminate based on a scheduled time of day (e.g., at 9 am, 10 am, 11 am, 12 pm, etc.) or a daily event (e.g., sunrise or sunset). In some embodiments, the indicators 715 may be configured to provide a visual indication that the illumination component 730 is ON and provide extra work light at night (e.g., after sunset or after, for example, 5 pm). In some embodiments, the indicators 715 may be configured to illuminate to help a user locate the light 134. For example, the indicators 715 may be configured to illuminate at 7 am when a user's workday begins.

The light 135 includes the host-side PCB 720 that is configured to be electrically coupleable to the wireless communication component 20. In some embodiments, similar to the host-side PCB 620 (FIG. 6) the host-side PCB 720 includes an energy storage device (e.g., a coin cell battery) separate from the battery pack 10 of the power tool 105.

The wireless communication component 20 includes the wireless communication controller 400, described above in FIG. 4, for communicating with the external device 505. As described above, the wireless communication component 20 may receive a command from the external device 505. For example, the wireless communication component 20 may receive a command to prohibit the illumination of an indicator 715 when the light 135 is communicating with the external device 505. The wireless communication component 20 communicates the command to the processing unit 745, and the processing unit 745 controls the indicator 715 accordingly.

Figure 8:
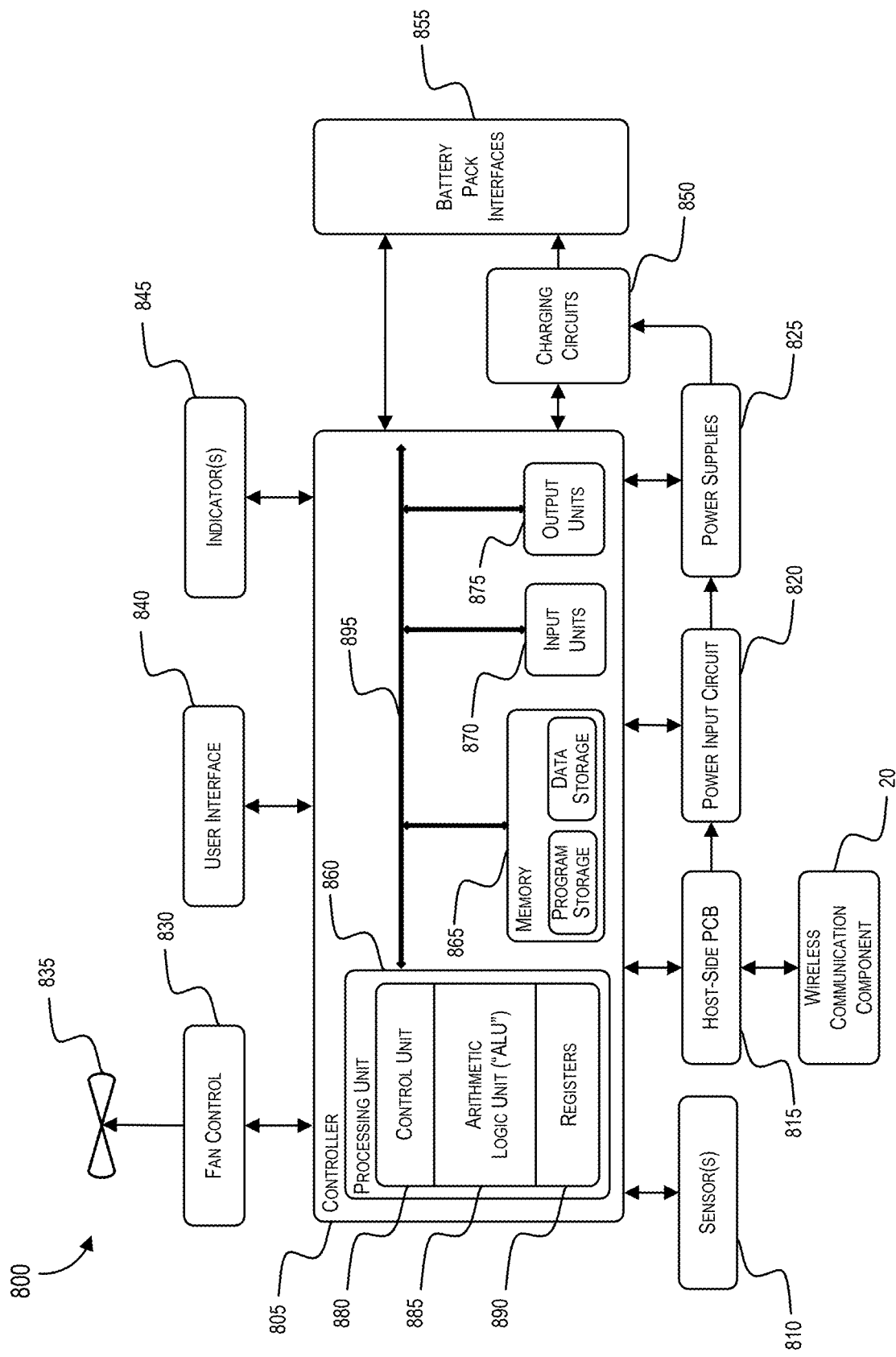
FIG. 8 illustrates a control system for another host device of FIG. 1, according to embodiments described herein.

FIG. 8 illustrates a control system 800 for the battery pack charger 140 or power supply 145 of FIG. 1. The control system 800 includes a controller 805. The controller 805 is electrically and/or communicatively connected to a variety of modules or components of the charger 140 or power supply 145. For example, the illustrated controller 805 is electrically connected to sensor(s) 810, a host-side PCB 815 (connected to a wireless communication component 20), a power input circuit 820, power supplies 825, a fan control 830, a user interface 840, indicator(s) 845, charging circuits 850, and battery pack interfaces 855. The fan control 830 operates a fan 835. In some embodiments, the user interface 840 includes a touchscreen. In some embodiments, the user interface 840 includes various components (e.g., switches, buttons, levers, dials, etc.) that allow a user to interface with and control the charger 140 or power supply 145.

The controller 805 includes a plurality of electrical and electronic components that provide power, operational control, and protection to the components and modules within the controller 805 and/or charger 140/power supply 145. For example, the controller 805 includes, among other things, a processing unit 860 (e.g., a microprocessor, a microcontroller, an electronic controller, an electronic processer, or another suitable programmable device), a memory 865, input units 870, and output units 875. The processing unit 860 includes, among other things, a control unit 880, an arithmetic logic unit ("ALU") 885, and a plurality of registers 890 (shown as a group of registers in FIG. 8), and is implemented using a known computer architecture (e.g., a modified Harvard architecture, a von Neumann architecture, etc.). The processing unit 860, the memory 865, the input units 870, and the output units 875, as well as the various modules or circuits connected to the controller 805 are connected by one or more control and/or data buses (e.g., common bus 895). The control and/or data buses are shown generally in FIG. 8 for illustrative purposes. The use of one or more control and/or data buses for the interconnection between and communication among the various modules, circuits, and components would be known to a person skilled in the art in view of the embodiments described herein.

The memory 865 is a non-transitory computer readable medium and includes, for example, a program storage area and a data storage area. The memory 865 and the processing unit 860 function similarly to the memory 660 and processing unit 655 of FIG. 6.

The battery pack interfaces 855 include a combination of mechanical components (e.g., rails, grooves, latches, etc.) and electrical components (e.g., one or more terminals) configured to and operable for interfacing (e.g., mechanically, electrically, and communicatively connecting) the charger 140 or power supply 145 with a battery pack (e.g., battery pack 10). For example, the battery pack interfaces 855 are configured to receive power through the charging circuits 850 via the power input circuit 820. The battery pack interfaces 855 are also configured to communicatively connect to the controller 805 via one or more communications lines.

In some embodiments, the controller 805 is configured to control the transfer of power to the charging circuits 850 based on detected power conditions in the charger 140 or power supply 145. For example, current sensors and voltage sensors included in the sensors 810 communicate to the controller 805 the amount of current and voltage available in the charger 140 or power supply 145, respectively. The individual charging circuits 850 can communicate, to the controller 805, the amount of power needed by battery packs as well as a power rating of the battery packs that are electrically connected to the respective charging circuits 850.

The indicators 845 are also coupled to the processing unit 860 and receive control signals from the processing unit 860 to turn ON and OFF or otherwise convey information based on different states of the charger 140 or power supply 145 and/or input from the external device 505 via the wireless communication component 20. The indicators 845 include, for example, one or more light-emitting diodes ("LEDs"), or a display screen. The indicators 845 can be configured to display conditions of, or information associated with, the charger 140 or power supply 145. For example, one or more of the indicators 845 are configured to indicate that data is being transferred between the charger 140 or power supply 145 and the external device 505 via a constant illumination, flashing at a preset interval, or illuminating with a soft undulation. As another example, one or more of the indicators 845 may provide a visual indication that data is ready to be sent by the wireless communication component 20 but that the wireless communication component 20 has not yet synched with the external device 505. The visual indication for not yet synched data may be a constant illumination in a predetermined color (e.g., orange). As another example, the indicators 845 may provide a visual indication that data is uploading to the external device 505, via the wireless communication component 20. The visual indication for uploading data may be a slow undulation in a predetermined color (e.g., blue). As another example, the indicators 845 may provide a visual indication that data is uploaded, via the wireless communication component 20, to the external device 505. The visual indication for indicating that data is uploaded may be a constant illumination in a predetermined color (e.g., green). The indicators 845 may also include elements to convey information to a user through audible or tactile outputs. In some embodiments, the controller 805 may determine that the charger 140 or power supply 145 is idle and provide a visual indication (e.g., keeping the visual indicators 845 OFF). The charger 140 or power supply 145 may be considered to be idle based on at least one of a sensor input (e.g., no power provided via the battery pack interface 855, an elapsed period since the wireless communication component 20 has transferred data, an elapsed period since the charger 140 or power supply 145 has been operated, and pre-configured hours that the charger 140 or power supply 145 is OFF (e.g., configured via the external device 505).

In some embodiments, the indicators 845 may be configured to illuminate at certain times of the day. For example, the indicators 845 may be configured (e.g., via the wireless communication component 20) to illuminate based on a scheduled time of day (e.g., at 9 am, 10 am, 11 am, 12 pm, etc.) or a daily event (e.g., sunrise or sunset). In some embodiments, the indicators 845 may be configured to provide a visual indication that charger 140 or power supply 145 is ON and provide work light at night (e.g., after sunset or after, for example, 5 pm). In some embodiments, the indicators 845 may be configured to illuminate to help a user locate the charger 140 or power supply 145. For example, the indicators 845 may be configured to illuminate at 7 am when a user's workday begins.

The charger 140 includes the host-side PCB 815 that is configured to be electrically coupleable to the wireless communication component 20. In some embodiments, the host-side PCB 815 receives power from the power input circuit 820. The wireless communication component 20 includes the wireless communication controller 400, described above in FIG. 4, for communicating with the external device 505. As described above, the wireless communication component 20 may receive a command from the external device 505. For example, the wireless communication component 20 may receive a command to prohibit the illumination of an indicator 845 when the light 135 is communicating with the external device 505. The wireless communication component 20 communicates the command to the processing unit 860, and the processing unit 860 controls the indicator 845 accordingly.

Figure 9:
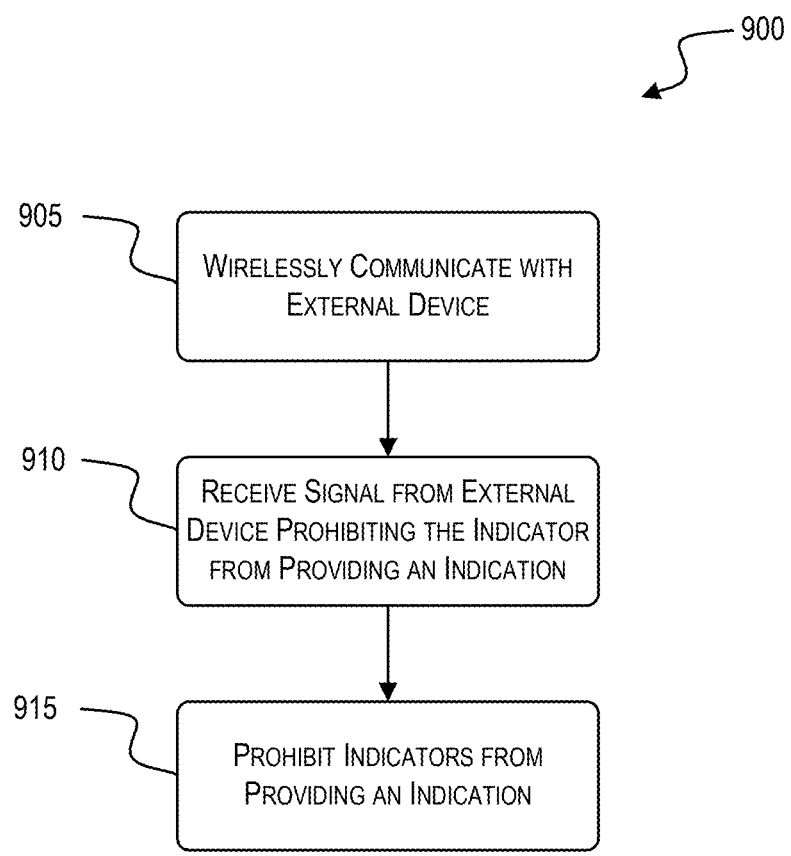
FIG. 9 is a process for prohibiting an indicator from providing an indication, according to embodiments described herein.

FIG. 9 is a process 900 for prohibiting an indicator, such as indicator 230, 615, from being illuminated. The process 900 is described herein as being performed by the wireless communication controller 400 and the controller 605. However, the process 900 may executed in conjunction with any wireless communication device and any one of the controllers 605, 705, 805 described herein.

The process 900 begins with the wireless communication component 20 wirelessly communicating with the external device 505 (Block 905). In some embodiments, the wireless communication controller 400 transmits data to the external device 505 via the transceiver 415. For example, the data may include power tool 105 usage data. Usage data may include a timeline of when the power tool 105 was operated, the motor torque of the motor 640, amount of charge left in the battery pack 10, etc. Alternatively, or additionally, in some embodiments, communicating with the external device 505 may include the external device 505 transmitting data to the wireless communication controller 400. For example, the external device 505 may transmit configuration and programming information to the power tool 105 based on a selected tool profile selected on the interface 1200. In some embodiments, wireless communication may include the external device 505 sending a command to the wireless communication controller 400 or the wireless communication controller 400 sending a one-directional beacon message to the external device.

In some embodiments, block 905 may be skipped, and the wireless communication controller 400 may not have to communicate with the external device 505 for the process 900 to proceed to Block 910.

At Block 910, the wireless communication controller 400 receives a signal from the external device 505 prohibiting the indicator 230, 615 from providing an indication. In some embodiments, the signal is automatically sent from the external device 505 when a power tool 105 is connected with the external device 505, as evidenced by the power tool 105 identification appearing on the communication configuration page 1205. Alternatively or additionally, in some embodiments, a user may configure the signal to be sent from the external device 505 via the communication configuration page 1205. For example, with reference to FIG. 12, the user may toggle the "Turn-Off Indicators" button 1210 on the communication configuration page 1205 of the interface 1200, and the external device 505 sends the signal to the wireless communication component 20 that is coupled to the power tool 105. In some embodiments, toggling the "Turn-Off Indicators" button 1210 on the communication configuration page 1205 of the interface 1200 may completely prohibit the indicator 230, 615 from providing any indications (e.g., from being illuminated). Alternatively or additionally, toggling the "Turn-Off Indicators" button 1210 may just prohibit the indicator 230, 615 from providing any indication when the power tool 105 is wireless communicating or transferring data with the external device, but would still provide indications of user activity (e.g., a trigger pull). Further, alternatively or additionally, a user may customize the settings of the "Turn-Off Indicators" button 1210 via the interface 1200. For example, a user may customize the settings to enable the indicator 230, 615 to provide an indication when the power tool 105 is interacted with (e.g., when the trigger 225 is pulled), but not during wireless communication with the external device 505. In some embodiments, toggling the "Turn-Off Indicators" button 1210 may prohibit the indicator 230, 615 from providing an indication for a set amount of time and/or a set number of data transfers. For example, toggling the "Turn-Off Indicators" button 1210 may prohibit the indicator 230, 615 from providing an indication for an hour and/or for 20 instances of wireless communication. In some embodiments a registry entry is controlled to disable or control indications using one signal. The registry entry could remain in that state until another signal is received to change the register entry.

At Block 915, the controller 605 prohibits the indicator 230, 615 from providing an indication. In some embodiments, the wireless communication controller 400 communicates the signal to the processing unit 655 of the power tool controller 605 and the processing unit 655 may prohibit the indicator 230, 615 from illuminating based on the communication from the wireless communication controller 400. In some embodiments, in response to the wireless communication controller 400 receiving a signal from the external device 505 prohibiting the indicator 230, 615 from providing an indication, the indicator 230, 615 will cease to indicate during any wireless communication moving forward.

Figure 10:
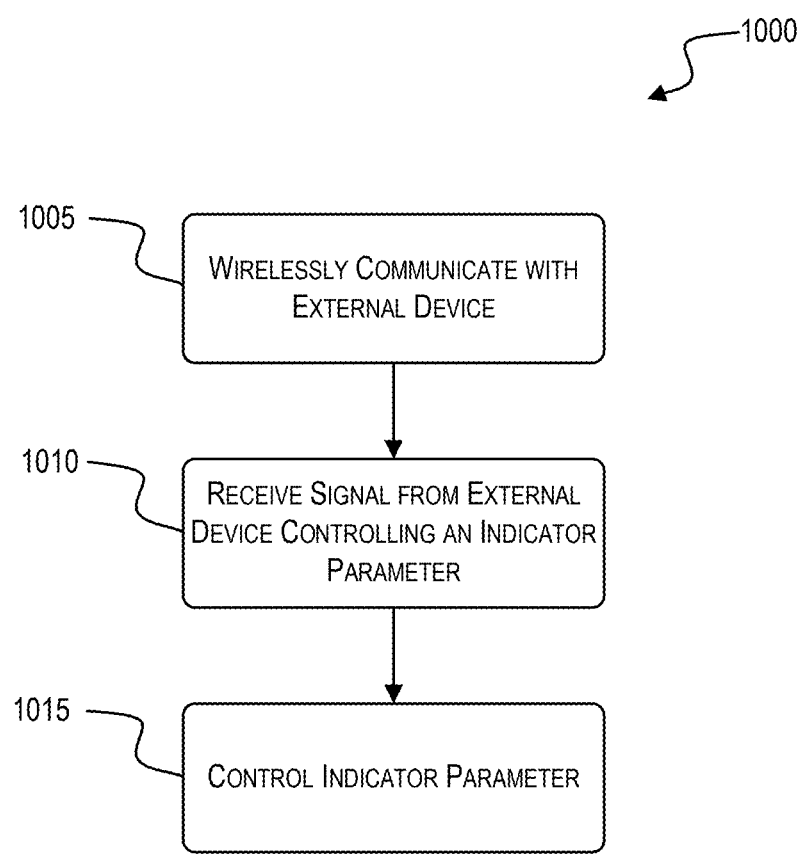
FIG. 10 is a process for controlling an indicator parameter, according to embodiments described herein.

FIG. 10 is a process 1000 for controlling a parameter of the indicator 230, 615. The process 1000 is described herein as being performed by the wireless communication controller 400 and the controller 605. However, the process 1000 may executed in conjunction with any wireless communication device and any one of the controllers 605, 705, 805 described herein.

The process 1000 begins with the wireless communication component 20 wirelessly communicating with the external device 505 (Block 1005). In some embodiments, the wireless communication controller 400 transmits data to the external device 505 via the transceiver 415. For example, the data may include power tool 105 usage data. Usage data may include a timeline of when the power tool 105 was operated, the motor torque of the motor 640, amount of charge left in the battery pack 10, etc. Alternatively, or additionally, in some embodiments, communicating with the external device 505 may include the external device 505 transmitting data to the wireless communication controller 400. For example, the external device 505 may transmit configuration and programming information to the power tool 105 based on a selected tool profile selected in the interface 1200. In some embodiments, wireless communication may include the external device 505 sending a command to the wireless communication controller 400 or the wireless communication controller 400 to sending a one-directional beacon message (e.g., a broadcast message) to the external device.

In some embodiments, block 1005 may be skipped, and the wireless communication controller 400 may not have to wirelessly communicate with the external device 505 for the process 1000 to proceed to Block 1010.

At Block 1010, the wireless communication controller 400 receives a signal from the external device 505 controlling an indicator parameter. In some embodiments, a user may configure the signal to be sent from the external device via the interface 1200. For example, with reference to FIG. 12, the user may toggle one of the "Change Indicator Color" button 1215 and/or the "Change Indicator Rate" button 1220 on the communication configuration page 1205 of the interface 1200 and the external device 505 sends the signal to the wireless communication component 20 that is coupled to the power tool 105. The user may control the color of the indicator 230, 615 when it illuminates. For example, the default illumination color may be white, however, the user may choose from yellow, red, green, blue, etc., via the "Change Indicator Color" button 1215. The user may also control the blinking rate of the indicator 230, 615. For example, the default blinking rate may be 1×, however, the user may choose from 0.5×, 1.5×, 2×, etc. via the "Change Indicator Rate" button 1220. In some embodiments, the user may control an undulation rate of the indicator 230, 615 via the interface 1200.

Alternatively or additionally, in some embodiments, the external device 505 may automatically control the indicator 230, 615 based on operational parameters of the power tool 105. For example, the power tool 105 may wirelessly communicate a type of power source (e.g., a coil cell, battery pack 10, etc.) to the external device 505 and, based on the type of power source, the external device 505 may send a signal controlling the indicator 230, 615 to either halt indication or to indicate. When the power tool 105 is running on a coin cell, it may save power to halt the indicator 230, 615 from providing an indication. However, once the power tool 105 is coupled to the battery pack 10, indication by the indicator 230, 615 may be desired to be resumed. As another example, the external device 505 may determine that it is night-time and may automatically send a signal to the wireless communication controller 400 to halt the indicator 230, 615 from providing an indication.

In some embodiments, the external device 505 may send a signal to the power tool 105 based on the type of wireless communication at block 1005. For example, when the external device 505 determines that the power tool 105 was locked by a user based on the wireless communication at block 1005, the signal sent from the external device 505 may enable the indicator 230, 615 to provide an indication that indicates a locked tool. As another example, when the external device 505 determines that the power tool 105 is paired with the external device 505 and/or another device, the signal sent from the external device 505 may enable the indicator 230, 615 to provide an indication that indicates that pairing has taking place. The external device 505 may customize when the indicator 230, 615 provides an indication and, thus, may alternate between prohibiting the indicator 230, 615 from providing an indication and enabling the indicator 230, 615 to provide an indication, based on the wireless communication. In some embodiments, a user can press and hold an input (e.g., a button) of a user interface to modify an operation of the indicator 230, 615. In some embodiments, a brightness of the indicator 230, 615 can vary depending on a visibility factor, such as an amount of detected ambient light.

At block 1015, the controller 605 controls the indicator 230, 615 according to the indicator parameter. In some embodiments, the wireless communication controller 400 communicates the signal to the processing unit 655 of the power tool controller 605 and the processing unit 655 may control the parameter of the indicator 230, 615 based on the communication from the wireless communication controller

400. For example, the processing unit 655 may change the illumination color of the indicator 230, 615 to red based on the signal.

Figure 11:
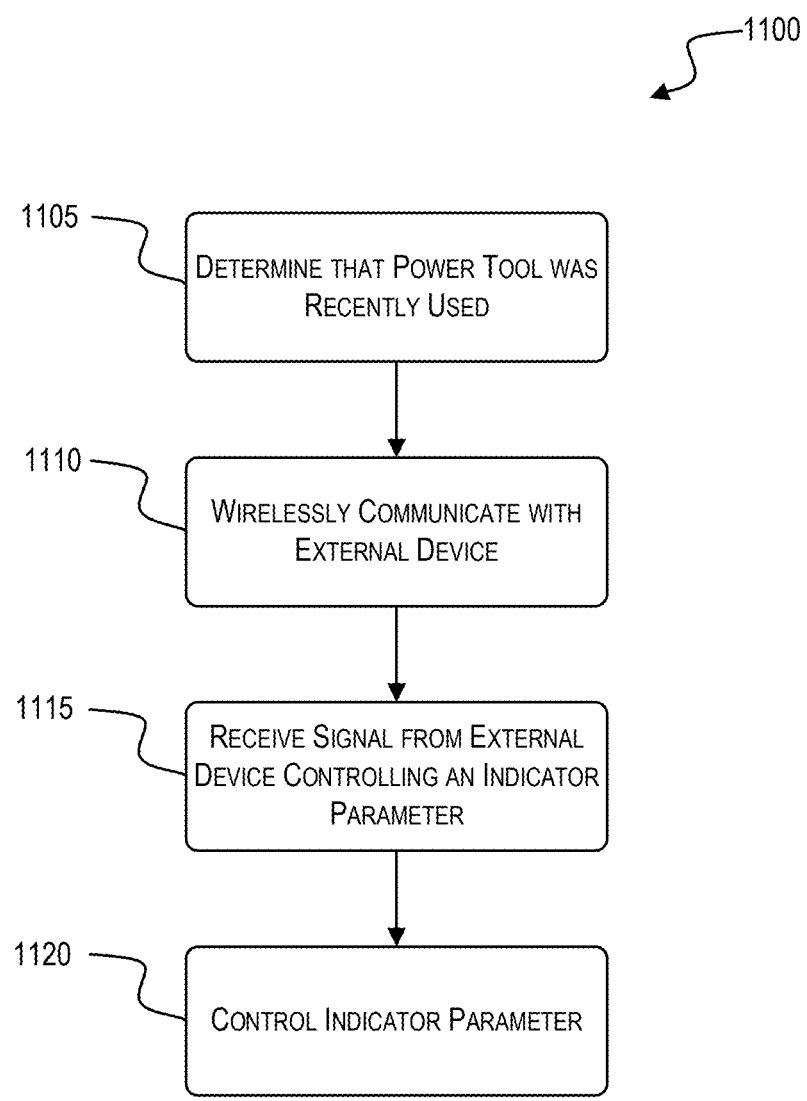
FIG. 11 is a process for controlling an indicator parameter based on a determined power tool device usage, according to embodiments described herein.

FIG. 11 is a process 1100 for controlling an indicator parameter based on a determined power tool 105 usage. The process 1100 is described herein as being performed by the wireless communication controller 400 and the controller 605. However, the process 1100 may be executed in conjunction with any wireless communication device and any one of the controllers 605, 705, 805 described herein.

The process 1100 begins with the wireless communication controller 400 determining that the power tool 105 was recently used (at Block 1105). In some embodiments, the wireless communication controller 400 communicates with the processing unit 655 of the power tool 105 coupled to the wireless communication component 20 to determine usage data of the power tool 105. For example, based on input from the trigger switch 625, the processing unit 655 may determine that the power tool 105 recently performed a function, and the processing unit 655 may communicate the time elapsed since the power tool 105 was used to the wireless communication controller 400. As another example, the processing unit 655 may determine an operation mode of the power tool 105 based on the state of the selection switch 215.

At Block 1110, the wireless communication controller 400 wirelessly communicates with the external device 505. For example, the wireless communication controller 400 transmits the time elapsed since the power tool 105 was used to the external device 505.

At Block 1115, the wireless communication controller 400 receives a signal from the external device 505 controlling an indicator parameter. In some embodiments, a user may configure the signal to be sent from the external device via the interface 1200. For example, with reference to FIG. 12, the user may toggle the "Turn-ON Usage Indication" button 1225 on the communication configuration page 1205 of the interface 1200 and the external device 505 sends the signal to the wireless communication component 20 that is coupled to the power tool 105. For example, the indicator 230, 615 may be at a maximum intensity when receiving 20 milli-Amps (mA) of current, however, based on the elapsed time since the power tool 105 was used being less than a threshold, the external device 505 may send a signal to the wireless communication controller 400 to decrease the current to the indicator 230, 615 to 10 mA, dimming the light. Alternatively, or additionally, the signal from the external device 505 may change the color of the indicator 230, 615 based on the received data. In some embodiments, the external device may automatically send an indicator parameter control signal without a user interacting with the interface 1200.

At Block 1120, the controller 605 controls the indicator 230, 615 according to the indicator parameter. In some embodiments, the wireless communication controller 400 communicates the signal to the processing unit 655 of the power tool controller 605 and the processing unit 655 may control the parameter of the indicator 230, 615 based on the communication from the wireless communication controller 400. For example, the processing unit 655 may dim the illumination intensity of the indicator 230, 615 by lessening the current to the indicator 230, 615, based on the signal.

Although the blocks of processes 900, 1000, 1100 are illustrated serially and in a particular order in FIGS. 9, 10, and 11, in some embodiments, one or more of the blocks are implemented in parallel, in a different order than shown, or are bypassed.

Although processes 900, 1000, 1100 are described with respect to wireless communication, in some embodiments, the processes 900, 1000, 1100 may be implemented via a wired connection (e.g., universal serial bus [USB] connection, battery pins, etc.). For example, the power tool 105 may include an integrated battery that is charged with power from the external device 505 via a USB cable and the indicator 230, 615 may indicate that charging is occurring or that data is being transfer between the power tool 105 and the external device 505. The power tool 105 may receive a signal from the external device 505 via the USB cable prohibiting the indicator 230, 615 from providing an indication and/or controlling an indicator parameter, similar to in processes 900, 1000, 1100.

FIG. 12 illustrates an interface 1200 of the external device 505 for controlling an indicator of a host device. Alternatively or additionally, in some embodiments, the interface 1200 may be integrated into the housing of the power tool 105. The interface 1200 is described with respect to the power tool 105, however any device including, or coupled to, a wireless communication device may be contemplated. The interface 1200 displays a communication configuration page 1205 with various identifiers and configuration controls displayed on the communication configuration page 1205. For example, the identifiers include the name of the power tool 105, as well as an identification number associated with the power tool 105. The communication configuration page 1205 also includes buttons 1210, 1215, 1220, 1225 for controlling parameters of at least one indicator 230, 615 included on the power tool 105. In some embodiments, interface 1200 may also allow a user to view the data transmitted from the wireless communication component 20. For example, the communication configuration page may include an additional button that a user may select to set a default configuration that makes the transmitted data viewable or hidden. In some embodiments, the interface 1200 can also be used to set a permission or access level for the power tool 105. For example, three different permission or access levels can be set for the power tool 105. Each level provides different functionality for the power tool 105. In some embodiments, the most restrictive permission level prevents the use of the power tool 105. A second permission level permits the use of the power tool at any time, any place, and for any operation. An intermediate permission level can prevent some functionality or use of the power tool 105. For example, a torque limit or operational use limit (e.g., based on time of day or hours of use) can be implemented to restrict use of the power tool 105.

Thus, embodiments described herein provide, among other things, systems and methods for prohibiting the illumination of an indicator of a power tool based on a signal from an external device. Various features and advantages are set forth in the following claims.

What is claimed is:

1. A device comprising:
    a housing;
    an indicator configured to provide an indication;
    a first electronic processor within the housing and configured to control operation of the indicator; and
    a wireless communication device including a second electronic processor, the wireless communication device configured to:
        wirelessly communicate with an external device,
        communicate with the first electronic processer to transfer data between the first electronic processer and the external device, wherein the first electronic processor is configured to control operation of the indicator to provide the indication when the data is being transferred between the wireless communication device and the external device, receive a signal from the external device, and provide the signal to the first electronic processor, wherein the first electronic processor is configured to prohibit, in response to receiving the signal from the wireless communication device, the indicator from providing the indication when the wireless communication device is wirelessly communicating with the external device.

2. The device of claim 1, wherein the device includes one of a group consisting of a power tool, a work light, a power tool battery pack, and a battery pack charger.

3. The device of claim 1, wherein the wireless communication device includes an energy storage device.

4. The device of claim 1, wherein the wireless communication device includes an antenna mounted to a printed circuit board ("PCB").

5. The device of claim 4, wherein the wireless communication device is configured to wirelessly communicate with the external device via the antenna over a cellular network.

6. The device of claim 4, wherein the second electronic processor is mounted on the PCB.

7. The device of claim 1, wherein the wireless communication device is further configured to:

receive a second signal from the external device; and provide the second signal to the first electronic processor;

wherein the first electronic processor is configured to control the indicator to illuminate based on the second signal.

8. The device of claim 7, wherein, based on the second signal, the first electronic processor is configured to control at least one of a color of the indicator, a blinking rate of the indicator, and an undulation rate of the indicator.

9. The device of claim 7, wherein, based on the second signal, the first electronic processor is configured to control the indicator to illuminate at a preset time of day.

10. A system comprising:

a first device including an electronic processor and an indicator that is controlled by the electronic processor;

an external device; and a wireless communication device that is removably coupled to the first device and includes a transceiver, wherein the wireless communication device is configured to:

receive an operational parameter from the electronic processor, transmit, via the transceiver, the operational parameter to the external device, wherein the electronic processor is configured to control the indicator to provide an indication when the wireless communication device transmits the operational parameter to the external device, and receive a signal from the external device based on the operational parameter, wherein the electronic processor is configured to, based on the signal from the external device, prohibit the indicator from providing the indication when the wireless communication device is wirelessly communicating with the external device.

11. The system of claim 10, wherein the operational parameter is a type of power source providing power to the first device.

12. The system of claim 11, wherein the first electronic processor is configured to control the indicator to halt indicating based on the signal when the operation parameter is a first type of power source.

13. The system of claim 10, wherein:

the first electronic processor is configured to control the indicator to provide a first indication after the operational parameter is sent to the wireless communication device and before the wireless communication device transmits the operational parameter to the external device;

the first electronic processor is configured to control the indicator to provide a second indication while the operational parameter is being transmitted to the external device; and the first electronic processor is configured to control the indicator to provide a third indication after the wireless communication device transmits the operational parameter to the external device and before the wireless communication device receives the signal from the external device.

14. The system of claim 10, wherein the electronic processor is configured to determine the first device has been idle for a predetermined time and is configured to control the indicator to be OFF.

15. A method of controlling an indicator of a device, the method comprising:

wirelessly communicating, by a wireless communication device of the device, with an external device;

communicating with an electronic processor to transfer data between the electronic processor and the external device, wherein the electronic processor is configured to control the indicator to provide an indication when the wireless communication device is wirelessly communicating with the external device;

receiving a signal from the external device; and providing the signal to the electronic processor to prohibit the indicator from providing the indication when the wireless communication device is wirelessly communicating with the external device.

16. The method of claim 15, wherein the device includes one of a group consisting of a power tool, a work light, a power tool battery pack, and a battery pack charger.

17. The method of claim 15, wherein wirelessly communicating with the external device includes wirelessly communicating over a cellular network.

18. The method of claim 15, further comprising:

receiving a second signal from the external device; and providing the second signal to the electronic processor to control the indicator to illuminate based on the second signal.

19. The method of claim 18, further comprising:

controlling at least one of a color of the indicator, a blinking rate of the indicator, and an undulation rate of the indicator.

20. The method of claim 18, further comprising:

controlling the indicator to illuminate at a preset time of day.

* * * * *